Figure 1:
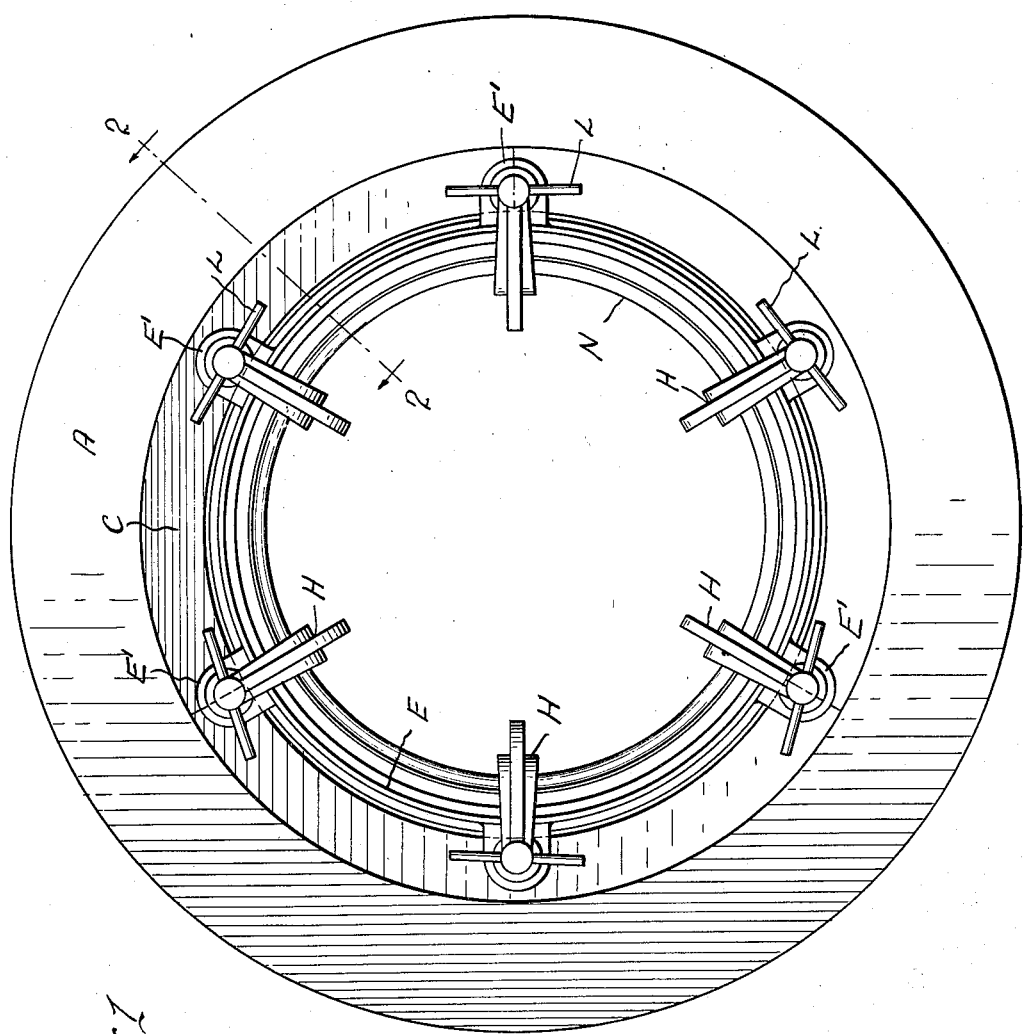

June 23, 1931.  J. C. HEINTZ  1,810,963
APPARATUS FOR RETREADING TIRES
Filed June 23, 1928   2 Sheets-Sheet 1

Inventor
James C. Heintz
By Hull Brock & West
Attorney

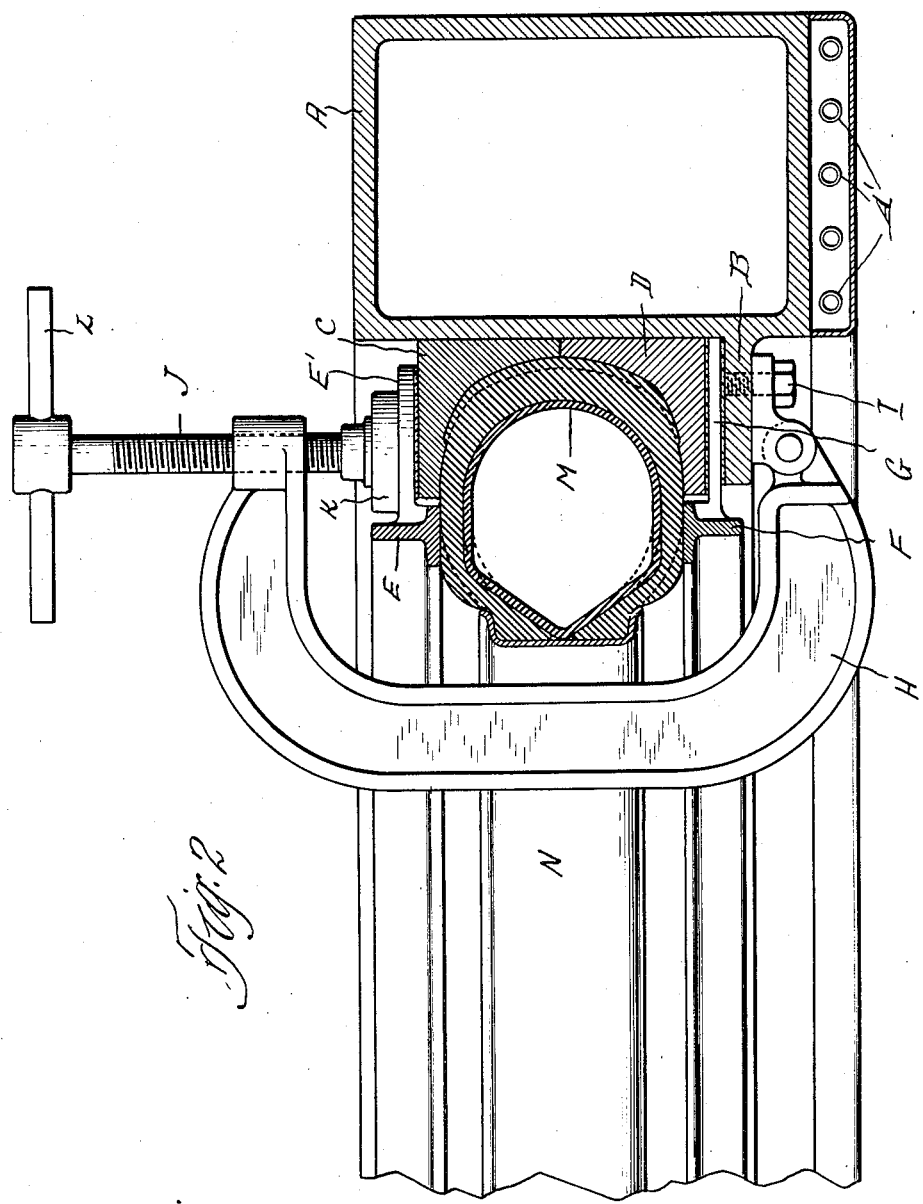

Patented June 23, 1931

1,810,963

UNITED STATES PATENT OFFICE

JAMES C. HEINTZ, OF LAKEWOOD, OHIO

APPARATUS FOR RETREADING TIRES

Application filed June 23, 1928. Serial No. 287,665.

This invention relates generally to a method and apparatus for retreading rubber tires and more particularly to vulcanizing apparatus designed for retreading the whole tire in a single operation.

The retreading of tires has been a difficult problem because of the variation in tire size and the inability of fitting tires of the same nominal size into the retread mold.

The methods generally used in retreading tires have been the "third circle method" and the "full circle method". The third circle molds which cure approximately one-third of a tire at each operation generally require a sand bag inside of the tire which is clamped down to force the tire against the mold. When tires are retreaded according to this method, an excessive amount of labor is necessary to operate the apparatus (at least three times as much as in the full circle molds). This method necessarily reduces the production because of the fact that it requires about four hours to retread a tire. Another disadvantage of this method is the inability to match up the tread design. Furthermore, overflow of uncured rubber at the end of each curing operation and the unequal distribution of tread thickness produces an unsatisfactory result.

The other method of retreading tires is the full circle mold which envelops the entire tire. In this process the tire carcass is stripped of the old rubber and recovered with new rubber and then cured in the same manner as a new tire, the mold enclosing the entire tire and receiving only tires of the dimensions which fit the mold. The main disadvantage of the full circle mold is lack of flexibility in curing variations in tires of the same nominal size. It is even impossible for tire factories to retread all of their own tires of a single size in one mold because some of the tires stretch greatly in service and when a tire is larger than the original tire mold a part of the fabric in the tire carcass will buckle, which is a very objectionable condition. Tires cured in this manner will also usually fail in the lower side wall close to the bead because the fabric structure of a tire will not stand the additional application of heat necessary in this process of retreading. Furthermore, the necessity of having a mold for each size tire to be retreaded requires a large amount of equipment and unnecessary expense.

According to my method and apparatus all of the objections to the third circle mold, as well as the full circle molds, are overcome and the following distinct operating advantages and objects are obtained:

1st. A single apparatus with readily interchangeable matrix sections handles all tires of approximately the same over-all diameter.

2nd. By applying the heat only to the tread of the tire and leaving the lower side wall and bead of the tire substantially unheated there is no damage as a result of overheating or overcuring those parts.

3rd. Due to the peculiar construction of my apparatus, a minimum amount of equipment is required to handle a wide range of tire sizes. For example, a single matrix will handle all 29 x 4.40 tires as well as 29 x 4.75 tires.

4th. By the addition of suitable matrix sections at any time any new or additional tire sizes can be handled in the same equipment.

5th. In my apparatus I make use of a standard road rim which replaces special cores and rings and the retreading is made in one operation thus eliminating the necessity for matching the different tread sections.

6th. I make use of a standard curing bag similar to the bag used by the tire manufacturer and which exerts the same pressure on every square inch of the tire. The bag is entirely enclosed by the tire and road rim and requires no strengthening, reinforcing or special core. Tires of varying size may be retreaded in the same equipment and high grade work is obtained with no distortion or marking of the tire.

7th. I provide side wall holding means consisting of a pair of oppositely disposed rings or holding members which serve to prevent distortion or displacement of the side walls due to the internal pressure, and which are also so arranged that a tire may adjust itself to the retreading mold.

8th. Because of the floating action of the road rim and tire the tread is placed in the center of the tire automatically.

9th. By employing road rims of different diameters, tires of different sizes can be handled.

10th. I have provided a very simple method of assembling and clamping the various parts of the mold together.

11th. The tire is cured with a slight stretching action on the tire carcass, thereby preventing "buckling" of the carcass.

Further and more limited objects and advantages of the invention will appear as the description proceeds and by reference to the accompanying drawings in which Fig. 1 is a top plan view of a retreading apparatus constructed in accordance with the preferred embodiment of my invention and Fig. 2 is a vertical sectional view on the line 2—2 of Fig. 1.

Referring now to the drawings, my apparatus comprises a hollow annular heating chamber A which is adapted to contain water which is preferably heated by means of electrical heating elements A' arranged in a casing below the bottom thereof, although it is understood that gas or steam may be employed for this purpose. This annular heating chamber is provided with the usual water gauge, safety valve and vent (not shown). The heating chamber A is provided with an inwardly extending flange B which is preferably formed integral therewith and adapted to support upper and lower matrix members C and D which are shaped in section and shown most clearly in Fig. 2, each member being composed of a plurality of segmental matrix sections. The matrix sections are of such a size as to be readily inserted within the central annular space within the heating chamber.

The matrix members C and D are so shaped as, when assembled, to provide a tread receiving portion of such a size as to receive only the tread portion of the tire therein. From an inspection of Fig. 2, it will be seen that the matrix extends only over the tread portion of the tire and that substantially all of the side walls of the tire are out of contact with the matrix.

For holding the side walls of the tire against distortion or displacement, I provide holding rings or members E and F which are shaped in section as shown in Fig. 2. The lowermost ring F is provided with a plurality of extensions G which are insulated on both sides, the purpose of which will hereinafter appear. The ring E is provided with a plurality of extensions E' which are insulated on one side, the purpose of which will also hereinafter appear.

Pivotally secured to the flange B are a plurality of C clamps H which are secured to the flange by means of bolts I. Each C clamp H has threadedly secured in its upper end a threaded stem J to the lower end of which is secured a head K, and to the upper end of which is secured a handle L. These clamping members serve to clamp the matrix sections against each other and against the peripheral flange B on the heating chamber A and to clamp the rings E and F in place and to hold the entire assembly against displacement.

When it is desired to retread a tire, the old worn tread portion of the tire is removed and recovered with new rubber. An inner tube or bag M is inserted within the tire and this tube or bag is preferably of such a size and shape as to fill the entire casing. A standard road rim N is then secured over the beads of the tire casing. It is, of course, understood that the air bag M is provided with the usual connection by means of which the same may be inflated and that the rim is provided with an opening through which this connection may extend since the bag is inflated in the same manner as an ordinary tire is inflated. The holding ring F is first placed within the heating chamber with its projections G resting upon the peripheral flange B. The lower matrix sections are then inserted and rest on the projections G, as shown in Fig. 2. The tire is then placed in the mold and the upper matrix sections are inserted and the upper holding ring E placed thereon, as shown in Fig. 2 and the C clamps H moved to the position shown in Fig. 2 and the stems J screwed down to securely clamp the matrices and holding rings in place.

The heads K engage the projections E' on the holding ring E and the whole assembly is rigidly secured in place. The projections E' and G are of such length as to position the holding rings so as to provide an air space between the holding rings and the matrix sections and are insulated from the matrix sections so as to prevent transfer of heat to the holding rings by conduction.

The parts are now assembled in their proper position. The heating chamber has been previously heated and all that is necessary to complete the retreading operation is to apply pressure to the tread of the tire by inflating the air bag and continue the application of heating and pressure for the proper length of time. Then the air bag is deflated, the clamps H are loosened and swung downwardly about their pivots and the tire removed from the apparatus.

The projections on the holding rings, being insulated from the matrix and of such length as to position the holding rings so as to leave an annular air space between the holding rings and the matrix, the side walls of the tire are substantially unheated and thereby any vulcanizing of the side walls of the tire is prevented. The apparatus requires no special bag or inner tube and also requires no special cores for holding the air bag in place. The holding rings also absorb the major part of the strain of the air bag and relieve the side walls of the tire and also permit the air bag to force the tread of the tire into the matrices.

Due to the novel and peculiar construction of this apparatus, tires of considerable variation in size can be handled with a minimum of equipment. For instance, by providing a single annular heating chamber having a bore of proper dimensions and several sets of matrix sections having proper dimensions almost half of all present day balloon tire sizes can be handled. Each matrix handles tires of considerable size variation by reason of operating principles which I will now more thoroughly explain.

It will be noted by referring to the drawings hereto attached that the side wall holding rings E and F do not enclose the entire side wall (usually about 1½ to 2 inches on an average size tire being unsupported). If a tire is oversize a part of the side wall of the tire can bulge between the road rim and the side wall or holding ring. Since there is no heat applied to the tire either through the holding rings or at the rim, the tire will resume its original undistorted shape when the pressure in the air bag is released. It might also be explained that with pressure used in the air bag and the comparatively small unsupported part of the tire lying between the holding rings and the road rim that the actual strain on the fabric in the tire carcass is less than when it is inflated to normal pressure on a vehicle and the entire carcass subjected to the normal pressure of the inflated inner tube. The slight stretch of the carcass is beneficial because it prevents any tendency of the tire to buckle during the process. A normal size tire will not bulge to any great extent between the holding rings and the road rim but rather will assume a position approximately as shown in the dotted lines in Fig. 2.

My experiments in developing and perfecting, as well as in the actual operation of this apparatus have disclosed that where a tire is cured in the manner outlined and the side wall rings are kept unheated that the side walls of the tie are not marked and there is no permanent distortion in the tire whether the tire be normal or oversize.

Another feature which my apparatus provides is that by changing the size of the road rims on which the tire is mounted and by using proper size curing tubes, tires of different rim diameters may be cured with the same matrix. For instance a 33 x 6.00 balloon tire fits a 21 inch diameter rim and a 32 x 6.20 tire fits a 20 inch diameter rim and I retread both sizes of tires successfully with the same equipment, except for the change in road rims and curing tubes used.

The operation of this apparatus and method of procedure is so flexible that tires of considerable difference in size can be retreaded with the same equipment, for example, a 29 x 5.25 tire can be retreaded with a matrix which is intended primarily for a 29 x 4.95 with practically perfect results. The same matrix may be used to retread tires which have as much as one inch difference in diameter. In other words, it is not necessary that the retread mold accurately fit the tire being cured. With this apparatus there will be no distortion or marking of the tire and the retreaded tire closely approaches a new tire in appearance and service.

It will be noted that the tire-engaging surfaces of the rings E and F are non-convergent toward the supporting base or rim N, being substantially tangential to the adjacent portions of the inner walls of the skirts of the matrix and also extending in the same direction as the adjacent portions of such inner walls.

Various changes may be made in the details of my construction and method of operation without departing from the spirit of my invention and it is to be understood that my invention is to be limited only in accordance with the scope of the appended claims.

It will now be clear that I have provided a process and apparatus for retreading tires which accomplishes the objects of the invention as hereinbefore stated.

Having thus described my invention, what I claim is:

1. A full circle retreader for retreading tires comprising an annular heating chamber, a tread matrix arranged within said heating chamber and consisting of a plurality of sections shaped to define a tread receiving portion of such size as to receive only the tread of a tire, means for securing an inflated tire within said apparatus in such a position that the tread only of the tire lies within said tread receiving portion, a pair of annular holding rings disposed on opposite sides of the tire and engaging the opposite side walls thereof between the tread portion and beads, said holding rings being spaced from the said matrix so as to prevent transfer of heat thereto by conduction and having projections thereon extending over said tread matrix, and means for securing said holding rings and tread matrix against movement with respect to each other.

2. A full circle retreader for retreading tires comprising an annular heating chamber having an inwardly extending flange thereon, an annular tread matrix resting on said flange and consisting of a plurality of sections separable diametrically and circumferentially, said sections being so shaped and of such a size as to receive only the tread portion of a tire therein means for securing an inflated tire within said apparatus in such a position that only the tread of the tire is within said mold said means including a plurality of clamps pivotally connected with said heating chamber and adapted to be moved into a position to secure said sections in place, a pair of oppositely disposed holding rings adapted for engagement with the opposite side walls of the tire to hold the same against distortion due to internal pressure and held in place by said clamps, said holding rings extending over only a portion of the side walls of the tire so as to permit a portion of the side walls to expand when subjected to internal pressure.

3. A tire retreading mold comprising an annular heating chamber; a tread mold arranged within said heating chamber consisting of a pair of matching circular mold sections shaped to define a tread receiving portion of such size as to receive only the tread portion of a tire; a pair of side wall holding members engaging the opposite side walls of a tire; and a plurality of pivoted clamps for clamping said side wall holding members and mold sections in operative relation, said clamps being arranged to swing inwardly and away from the said mold and side wall holding members when not in use, said side wall holding members extending over only a portion of the side walls of the tire and leaving a substantial portion of the side walls adjacent the tire beads free to bulge when subjected to internal pressure, and means on said holding members for preventing movement of the same toward each other.

4. A full circle retreader for retreading tires comprising an annular heating chamber having an inwardly extending flange thereon, an annular tread matrix resting on said flange and consisting of a plurality of sections separable diametrically and circumferentially, said matrix being so shaped and of such a size as to receive only the tread portion of a tire therein, means for securing an inflated tire within said apparatus in such a position that only the tread of the tire is within said mold, said means including a plurality of clamps pivotally connected with said heating chamber and adapted to be moved into a position to secure said sections in place, a pair of oppositely disposed holding rings insulated from said tread mold and adapted for engagement with the opposite side walls of the tire to hold the same against distortion due to internal pressure and held in place by said clamps.

5. A tire retreading apparatus comprising a heating chamber and a matrix comprising a plurality of tread forming sections of such size and shape as to receive only the tread portion of a tire therein, a flexible bag adapted to be arranged within the tire and inflatable to force the tread portion of the tire against said matrix, separate side wall holding members engaging the opposite side walls of the tire to hold the same against distortion as a result of internal pressure, said side wall holding members engaging only a portion of the side walls and leaving a considerable space between their edges and the beads of the tire so as to permit the tire to bulge as a result of internal pressure, said side wall holding members being spaced from the matrix so as to maintain the same below vulcanizing temperature and having a plurality of projections thereon extending over said matrix and preventing movement of the holding rings toward each other.

6. A full circle retreader comprising a tread forming matrix including tread forming sections of such size and shape as to receive only the tread portion of a tire therein, means for securing an inflated tire within the apparatus in such a position that the tread only of the tire lies within the mold, side wall retaining members spaced a slight distance from the mold and disposed so as to engage the opposite side walls of the tire to hold the same against distortion, said side wall retaining members terminating a slight distance from the beads of the tire so as to permit a portion of the tire adjacent the beads to bulge as a result of internal pressure, said side wall retaining members having each a plurality of projections thereon extending over said matrix and preventing movement of the said members toward each other.

7. A full circle retreading mold including a matrix comprising a plurality of sections of such size and shape as to receive only the tread portion of a tire therein, holding rings spaced from the matrix and engaging the opposite side walls of the tire and having projections thereon extending over the matrix sections and preventing movement of the rings toward each other, a plurality of clamps holding said rings and matrix sections against relative movement, said holding rings extending over only a portion of the side walls and leaving a substantial portion free to bulge as a result of internal pressure within the tire.

8. A full circle retreader including a matrix comprising a plurality of sections of such size and shape as to receive only the tread portion of a tire therein, a pair of holding rings spaced from the matrix and disposed over the opposite side walls of the tire and having a plurality of projections thereon extending over the matrix and preventing movement of the rings toward each other, said holding rings extending over only a portion of the side walls and leaving a substantial portion free to expand as a result of internal pressure within the tire.

9. A full circle retreader including a matrix comprising a plurality of sections of such size and shape as to receive only the tread portion of a tire therein, a pair of side wall holding rings disposed on opposite sides of the tire and having means thereon extending over said sections and preventing movement of the holding rings toward each other, said holding rings being spaced from the matrix sections so as to maintain the same below vulcanizing temperature and extending over only a portion of the side walls and leaving a substantial portion of the side walls of the tire adjacent the tire beads free to expand as a result of internal pressure.

10. In an apparatus for retreading tires of varying sizes, the combination of a single matrix to receive the tread portions of said tires, means to heat the matrix to vulcanizing temperature, side wall holding rings with substantially parallel operative faces maintained at a non-vulcanizing temperature contacting the portions of the side walls at the edges of the matrix and adapted to prevent bulging of the tire over the edges of the matrix, means to hold the beads of the tires, the entire inner portions of the side walls being free to bulge with the excess material of the larger sizes of tires, and an expansible core within the tire.

11. A tire vulcanizing apparatus including a matrix to receive the tread portion of a tire, means for vulcanizing the tread, a base having flanges to receive the beads of the tire, an expansible bag located within the tire, and non-vulcanizing members the operative faces of which are substantially normal to the axis of the tire and are adapted to engage the side walls of the tire in close proximity to the skirts of the mold, the lower side walls of the tire being free so that the fullness of the tire is concentrated immediately above said flanges.

12. A full circle tire retreading apparatus comprising a matrix adapted to receive the tread portion of a tire, means for heating the said tread portion to vulcanizing temperature, side-wall holding rings having their tire-engaging surfaces substantially parallel the one with the other, means for supporting the said rings in proximity to the inner edges of the matrix to prevent the bulging of the tire over such edges of the matrix and for maintaining the said rings at a non-vulcanizing temperature, means spaced from said rings for holding the beads of said tire, and an expansible core for said tire.

13. A full circle tire retreading apparatus comprising a matrix adapted to receive the tread portion of a tire, means for heating the said tread portion to vulcanizing temperature, side-wall holding rings arranged adjacent to the inner edges of said matrix to prevent the bulging of the tire over such edges and having their tire-engaging surfaces constituting continuations of the respective inner walls of said matrix, the said surfaces being arranged substantially parallel the one with the other, means for supporting the said rings whereby they are maintained at a non-vulcanizing temperature, means spaced from said rings for holding the beads of said tire, and an expansible core for said tire.

14. A full-circle vulcanizing machine for retreading tires of varying size comprising a matrix to receive the tread portion of a tire and having oppositely disposed skirts extending to approximately the median line of the tire, a base for supporting and retaining the beads of a tire, an expansible core within the tire, and supporting rings arranged closely adjacent to and spaced from the skirts of said matrix for supporting the portions of the side walls of the tire adjacent to the said skirts and having tire-engaging surfaces disposed substantially tangential to the adjacent inner walls of their respective skirts, the inner edges of said rings being separated from said base to provide spaces for the concentration of an oversize tire.

15. A full circle vulcanizing machine for retreading tires of varying size comprising a matrix to receive the tread portion of a tire and having oppositely disposed skirts extending to approximately the median line of the tire, a base for supporting and retaining the beads of the tire, an expansible core within the tire, supporting rings arranged closely adjacent to and spaced from the skirts of said matrix for supporting the portions of the side walls of the tire adjacent to the said skirts and having tire engaging surfaces extending from the edges thereof which are adjacent to said skirts in substantially the same direction as the adjacent portions of the inner walls of said skirts, the inner edges of said rings being separated from said base to provide spaces for the concentration of an oversized tire.

16. A full circle vulcanizing machine for retreading tires of varying size comprising a matrix to receive the tread portion of a tire and having oppositely disposed skirts extending to approximately the median line of the tire, a base for supporting and retaining the beads of the tire, an expansible core within the tire, supporting rings arranged closely adjacent to and spaced from the skirts of said matrix for supporting the portions of the side walls of the tire adjacent to the said skirts and having tire-engaging surfaces which are non-convergent toward the said base, the inner edges of said rings being separated from said base to provide spaces for the concentration of an oversized tire.

17. A full circle vulcanizing machine for retreading tires of varying sizes comprising a matrix to receive the tread portion of a tire and having oppositely disposed skirts extending to approximately the median line of the tire, a base for supporting and retaining the beads of the tire, an expansible core within the tire, supporting members for the side walls of the tire disposed closely adjacent to and insulated from said skirts for holding the side walls of the tire adjacent to said skirts and having tire engaging surfaces extending from the edges thereof which are adjacent to said skirts in substantially the same direction as the adjacent portions of the inner walls of said skirts, the inner edges of said members being separate from said base and providing spaces for the concentration of an oversized tire.

In testimony whereof, I hereunto affix my signature.

JAMES C. HEINTZ.